United States Patent [19]

Kaufmann et al.

[11] Patent Number: 4,577,040

[45] Date of Patent: Mar. 18, 1986

[54] METHOD FOR PREPARING DIORGANOPOLYSILOXANES CONTAINING FLUOROALKYL GROUPS

[75] Inventors: Rudolf Kaufmann; Karl Braunsperger; Karl-Heinrich Wegehaupt, all of Burghausen, Fed. Rep. of Germany; Günter von Au, Sao Paulo, Brazil

[73] Assignee: Wacker-Chemie GmbH, Munich, Fed. Rep. of Germany

[21] Appl. No.: 552,578

[22] Filed: Nov. 16, 1983

[30] Foreign Application Priority Data

Dec. 29, 1982 [DE] Fed. Rep. of Germany ....... 3248546

[51] Int. Cl.$^4$ ............................................... C07F 7/08
[52] U.S. Cl. ........................................ 556/462; 528/21
[58] Field of Search .......................... 556/462; 528/21

[56] References Cited

U.S. PATENT DOCUMENTS

| | | |
|---|---|---|
| 3,398,118 | 8/1968 | Baronnier et al. ............. 556/462 X |
| 3,661,962 | 5/1972 | Geipel .................................. 556/462 |
| 4,075,169 | 2/1978 | Razzano ......................... 556/462 X |
| 4,138,543 | 2/1979 | Bargain et al. ................. 556/462 X |

Primary Examiner—Paul F. Shaver

[57] ABSTRACT

A method for preparing diorganopolysiloxanes containing fluoroalkyl and/or fluoroalkyloxyalkyl groups which comprises hydrolyzing dichlorosilanes containing fluoroalkyl and/or fluoroalkyloxyalkyl groups and thereafter equilibrating the hydrolyzed product in the presence of a compound having the formula

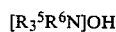

$[R_3{}^5R^6N]OH$ where $R^5$ is an alkyl radical having from 1 to 4 carbon atoms and $R^6$ is the same as $R^5$ or a benzyl radical.

4 Claims, No Drawings

METHOD FOR PREPARING DIORGANOPOLYSILOXANES CONTAINING FLUOROALKYL GROUPS

The present invention relates to fluoroalkyl containing silicone polymers and more particularly to a method for preparing diorganopolysiloxanes containing fluoroalkyl groups and/or fluoroalkyloxyalkyl groups.

BACKGROUND OF THE INVENTION

Fluorosilicone polymers and methods for preparing the same using quaternary amine salts, such as for example, benzyltrimethylammonium acetate, are described in German Patent Application No. 26 19 832 (Offenlegungsschrift). The amine salts serve as condensation catalysts for trimeric to pentameric organosilicon compounds which are obtained from the corresponding cyclic compounds. No rearrangement of bonds occurs in these condensation reactions.

Another method for preparing organopolysiloxanes containing fluoroalkyl groups is described in German Patent Application No. 28 34 172 (Offenlegungsschrift), in which the hydrolyzates of fluoroalkyl containing dichlorosilanes are cyclized and the resultant rings subsequently equilibrated in the presence of potassium hydroxide or potassium silanolate.

In contrast to the methods described above for preparing diorganopolysiloxanes containing fluoroalkyl groups, the additional cyclization step is omitted from the method of this invention. Thus, it has been found that fluoroalkyl containing organopolysiloxanes can be prepared from hydrolyzates or cohydrolyzates of fluoroalkyl containing dichlorosilanes in the presence of selected ammonium hydroxides in the absence of a cyclization step.

Therefore, it is an object of the present invention to provide a method for preparing fluoroalkyl containing diorganopolysiloxanes. Another object of the present invention is to provide a method for preparing fluoroalkyloxyalkyl containing diorganopolysiloxanes. Still another object of the present invention is to provide a method for preparing fluoroalkyl and/or fluoroalkyloxyalkyl containing diorganopolysiloxanes in the absence of a cyclization step. A further object of the present invention is to provide a method for preparing fluoroalkyl and/or fluoroalkyloxyalkyl containing diorganopolysiloxanes from hydrolyzates or cohydrolyzates of fluoroalkyl containing dichlorosilanes. A still further object of the present invention is to provide a method for preparing fluoroalkyl and/or fluoroalkyloxyalkyl containing diorganopolysiloxanes without forming and subsequently separating cyclic compounds.

SUMMARY OF THE INVENTION

The foregoing objects and others which will become apparent from the following description are accomplished in accordance with this invention, generally speaking, by providing a method for preparing fluoroalkyl and/or fluoroalkoxyalkyl containing diorganopolysiloxanes which comprises (a) hydrolyzing at least one silane having the formula:

$$R^1R^2SiCl_2$$

where $R^1$ represents an alkyl radical having from 1 to 6 carbon atoms or an aryl radical; $R^2$ represents a $R_F$—$CH_2$—$CH_2$ radical, where $R_F$ is a linear or branched perfluoro radical having from 1 to 12 carbon atoms or a fluoroalkyloxyalkyl radical having the formula:

$$C_nR_{2n+1}{}^3OR^4$$

where $R^3$ is hydrogen and fluorine; $R^4$ is a divalent radical having from 2 to 6 carbon atoms and n is an integer from 1 to 6; and thereafter (b) equilibrating the hydrolyzate prepared in (a) above in the presence of a compound having the formula:

$$[R_3{}^5R^6N]OH$$

where $R^5$ is an alkyl group having from 1 to 4 carbon atoms and $R^6$ is the same as $R^5$ or a benzyl radical.

DESCRIPTION OF THE INVENTION

Dichlorosilanes which are hydrolyzed to form the hydrolysates employed in the equilibration reaction of this invention are well known in the art. These dichlorosilanes may be represented by the general formula $R^1R^2SiCl_2$, where $R^1$ is an alkyl or aryl radical having up to 6 carbon atoms. Examples of suitable radicals represented by $R^1$ are the methyl, ethyl, n-propyl, iso-propyl, n-butyl, n-pentyl, and the n-hexyl radicals as well as the phenyl radical.

Suitable examples of the $R^2$ radical ($R_F$—$CH_2$—$CH_2$) are perfluoromethylethyl, perfluoroethylethyl, (perfluoro-n-propyl)ethyl, (perfluoro-iso-propyl)ethyl, (perfluoro-n-butyl)ethyl, (perfluoro-iso-butyl)ethyl, (perfluoro-tert-butyl)ethyl, (perfluoro-n-pentyl)ethyl, (perfluoro-isopentyl)ethyl, perfluoroneo-pentyl)ethyl, perfluorohexylethyl, perfluoroheptylethyl, perfluorooctylethyl, perfluorononylethyl, perfluorodecylethyl, perfluoroundecylethyl and perfluorododecylethyl. Other examples of $R^2$ radicals are fluoroalkyloxyalkyl radicals having the formula:

$$C_nR_{2n+1}{}^3OR^4$$

where n is preferably 2 or 3, such as the 1,1,2,2-tetrafluoroethyloxyethyl, 1,1,2,2-tetrafluoroethyloxypropyl, 1,1,2,2-tetrafluoroethyloxybutyl, 1,1,2,2-tetrafluoroethyloxypentyl, 1,1,2,2-tetrafluoroethyloxyhexyl, 1,1,1,2,3,3-hexafluoropropyloxyethyl and 1,1,1,2,3,3-hexafluoropropyloxypropyl radicals.

The catalysts employed in the equilibration reaction in accordance with this invention are represented by the formula:

$$[R_3{}^5R^6N]OH,$$

where $R^5$ is an alkyl radical such as the methyl, ethyl, propyl and butyl radicals. The radical represented by $R^6$ is a benzyl radical or a radical represented by $R^5$. Suitable examples of equilibration catalysts which may be used in accordance with this invention are tetramethylammonium hydroxide, tetraethylammonium hydroxide, tetrapropylammonium hydroxide, tetrabutylammonium hydroxide, benzyltrimethylammonium hydroxide, benzyltriethylammonium hydroxide and benzyldimethylethylammonium hydroxide.

A single silane as well as mixtures of various silanes may be employed in the hydrolysis step of this invention. Also, a procedure known as "gradient hydrolysis" may be employed in this invention in which hydrolyzates or cohydrolyzates are cohydrolyzed in a further hydrolysis reaction with an additional silane. In the cohydrolysis and in particular in the gradient hydrolysis, silanes having the formula:

$$R^1R^7SiCl_2$$

may be used in addition to silanes which contain fluoroalkyl or fluoroalkyloxyalkyl groups, in which $R^1$ is the same as above and $R^7$ may be the same as $R^1$ as well as hydrogen and alkenyl groups having from 2 to 6 carbon atoms.

Examples of suitable alkenyl groups containing from 2 to 6 carbon atoms are vinyl, ally, 1-butenyl, 1-pentenyl and 1-hexenyl.

The hydrolysis or cohydrolysis is preferably carried out in an aqueous medium. Water as well as 30 weight percent aqueous alkali hydroxide solutions can be used. Alkaline hydrolysis is preferred in the preparation of hydrolyzates which are reacted to form high polymeric organopolysiloxanes. Preferably, the silane or silane mixture is added to the aqueous medium with stirring. In gradient hydrolysis, the silanes are metered into the hydrolysis medium at intervals. At the end of the hydrolysis, the product is washed with hot water and the phases are then separated.

The resultant hydrolyzates or cohydrolyzates are generally diorganopolysiloxanes having hydroxyl groups in the terminal units and an average of from 3 to 100 diorganosiloxane units which contain fluoroalkyl and/or fluoroalkyloxyalkyl groups.

The equilibration reaction is carried out in accordance with this invention, in the presence of an equilibration catalyst. Preferably the amount of equilibration catalyst ranges from about 15 to 300 ppm by weight and more preferably from about 50 to 150 ppm by weight, based on the weight of the reactants. Generally, the reaction temperatures range from about 80° to 100° C. The reaction is preferably carried out under reduced pressure and in particular in the range of from 1 to 50 torr.

In addition to hydrolyzates which contain fluoroalkyl and/or fluoroalkyloxyalkyl groups, siloxanes having siloxane units of the formula:

$$-R^1R^7SiO-$$

can also be present in the reaction mixture. Other reaction components which may also be present in the reaction are organosilicon compounds which regulate chain length, such as those having the formula:

$$R^7R^1_2SiO(SiR^1_2-O)_m-SiR^1_2R^7$$

where $R^1$ and $R^7$ are the same as above and m is 0 or an integer from 1 to 100.

The equilibration reactions can be carried out in the absence or presence of a solvent in mixers, kneaders and so forth. The reactions generally take from about 0.25 to 2 hours. The reaction medium is then generally heated to approximately 150° C. for from about 15 to 30 minutes in order to decompose the equilibration catalyst. The volatile products of the reaction mixture are then removed at reduced pressure. The resultant organosilicon compounds containing homopolymeric or copolymeric fluoroalkyl and/or fluoroalkyloxyalkyl groups, have a viscosity in the range of from 10 to 200,000,000 mPa.s at 25° C.

A broad spectrum of fluoroalkylsilicones may be prepared by the method of this invention. These fluoroalkylsilicones, particularly fluoroalkylsilicone oils may be used as a lubricant base and as defoamers. Also, the fluoroalkylsilicone oils thus prepared may be employed to form fluoroalkylsilicone elastomers.

Various embodiments of the invention are illustrated in the following examples.

EXAMPLE 1

(a) About 1.18 kg of a 15 weight percent sodium hydroxide solution are added to a 4 liter, 3-neck flask equipped with a stirrer and then 922 g (2 mol) of [perfluoro(n-hexyl)ethyl]methyldichlorosilane are added dropwise with stirring over a 2 hour period. After stirring for an additional 15 minutes, the phases are separated and the hydrolyzate is washed with hot water until neutral.

The yield of hydrolyzate was 748 g, with a refractive index $n_D^{25} = 1.3420$ and a viscosity of 520 mPa.s at 25° C.

(b) A laboratory kneader capable of being evacuated and having a capacity of 500 ml was used to heat 162.4 g of the hydrolyzate prepared in accordance with (a) above, 65 g of a dimethylpolysiloxane having one OH group in each terminal unit and a viscosity of 100 mPa.s at 25° C., 10 g of a trimethylsiloxy end-blocked silicone oil containing dimethylsiloxy units and 0.125 g of benzyltrimethylammonium hydroxide as a 40 percent methanol solution to 100° C. The reaction mixture was kneaded for another 10 minutes after reaching this temperature and then evacuated to 3 torr. After another 2 hours reaction time, the reaction was terminated and the original murky mixture had been transformed into a clear liquid. Subsequently, the pressure was returned to atmospheric pressure and heated to 150° C. After about 30 minutes the kneader was evacuated once again to 12 torr in order to remove volatile components. A clear oil was obtained in a yield of 225 g, with a refractive index $n_D^{25} = 1.3628$ and a viscosity of 1044 mPa.s at 25° C.

EXAMPLE 2

(a) A cohydrolyzate was obtained from a mixture containing 1330 g of a 15 weight percent sodium hydroxide solution, 230.5 g (0.5 mol) of (perfluorohexylethyl)methyldichlorosilane, 273 g (1 mol) of (tetrafluoroethoxypropyl)methyldichlorosilane, 129 g (1 mol) of dimethyldichlorosilane by the simultaneous metered addition of the above-mentioned silanes in accordance with the procedure described in Example 1(a). The yield was 445 g, with a refractive index $n_D^{25} = 1.3730$ and a viscosity of 150 mPa.s at 25° C.

The following mixture was then equilibrated in accordance with the procedure described in Example 1(b).

481.5 g of cohydrolyzate prepared in 2(a) above, 18.5 g of a trimethylsiloxy end-blocked silicone oil containing 15 dimethylsiloxy units, and 0.1 ml of a 20 weight percent tetramethylammonium hydroxide-methanol solution (corresponding to approximately 50 ppm).

A clear oil was obtained having a refractive index $n_D^{25} = 1.3810$ and a viscosity of 4423 mPa.s at 25° C.

EXAMPLE 3

(a) The procedure of Example 1(a) was repeated except that a silane mixture containing 546 g (2 mol) of (tetrafluoroethyloxypropyl)methyldichlorosilane and 258 g (2 mol) of dimethyldichlorosilane was metered into a reactor containing 2130 g of a 15 weight percent sodium hydroxide solution. The yield of cohydrolyzate was 225 g, with a refractive index $n_D{}^{25}=1.3915$ and a viscosity of 91 mPa.s at 25° C.

(b) The procedure of Example 1(b) was repeated except that the following mixture was equilibrated:

320.5 g of the cohydrolyzate prepared in accordance with 3(a) above, 12 g of a trimethylsiloxy end-blocked silicone oil containing 15 dimethylsiloxy units, and 0.1 ml of a 20 weight percent tetramethylammonium hydroxide-methanol solution (corresponding to 60 ppm), About 312 g of a clear oil were obtained having a refractive index $n_D{}^{25}=1.3919$ and a viscosity of 5600 mPa.s at 25° C.

EXAMPLE 4

The following mixture was equilibrated:

198.3 g of the hydrolyzate prepared in accordance with Example 1(a), 180 g of a dimethylpolysiloxane having a hydroxyl group in each terminal unit and a viscosity of 100 mPa.s at 25° C., 0.8 g of a trimethylsiloxy end-blocked silicone oil containing 4 dimethylsiloxy units and a vinylmethylsiloxy group, 0.5 g of a dimethylpolysiloxane which has a vinyl group in each terminal unit and contains 98 dimethylsiloxy units, and 0.025 ml of a 20 weight percent tetramethylammonium hydroxide-methanol solution (corresponding to 15 ppm).

A clear, solid polymer was obtained in a yield of 315 g, with a refractive index $n_D{}^{25}=1.3710$ and a Brabender plasticity of 370 kg.

EXAMPLE 5

(a) A cohydrolyzate was obtained in a yield of 543 g in a procedure similar to that of Example 1(a) in which the following silane mixture was metered into a reactor containing 160 g of 20 weight percent sodium hydroxide solution:

760 g (3.6 mol) of trifluoropropylmethyldichlorosilane, 51.6 g (0.4 mol) of dimethyldichlorosilane.

(b) In a procedure similar to that described in Example 1(b), the following mixture was equilibrated:

300 g of the cohydrolyzate prepared in accordance with Example 5(a) above, 1.5 g of a trimethylsiloxy end-blocked silicone oil containing 4 dimethylsiloxy units and a vinylmethylsiloxy group, 0.5 g of a dimethylpolysiloxane containing 98 dimethylsiloxy units and a vinyl group in each terminal unit, and 0.08 ml of 40 weight percent benzyltrimethylammonium hydroxide-methanol solution (corresponding to 100 ppm).

A clear, solid polymer was obtained in a yield of 285 g, with a refractive index $n_D{}^{25}=1.3802$ and a Brabender plasticity of 480 kg.

What is claimed is:

1. A method for preparing diorganopolysiloxanes containing fluoroalkyl groups and/or fluoroalkyloxyalkyl groups which comprises (a) hydrolyzing at least one silane of the formula:

$$R^1R^2SiCl_2$$

where $R^1$ is selected from the group consisting of an alkyl radical having from 1 to 6 carbon atoms and an aryl radical; $R^2$ is a radical selected from the group consisting of $R_F$—$CH_2$—$CH_2$—, where $R_F$ is a perfluoro radical having from 1 to 12 carbon atoms and a fluoroalkyloxyalkyl radical having the formula:

$$C_nR_{2n+1}{}^3OR^4$$

where $R^3$ is hydrogen and fluorine; $R^4$ is a divalent aliphatic radical having from 2 to 6 carbon atoms and n is an integer from 1 to 6, and thereafter (b) equilibrating the hydrolyzate in the presence of a compound having the formula:

$$[R_3{}^5R^6N]OH$$

where $R^5$ is an alkyl radical having from 1 to 4 carbon atoms and $R^6$ is selected from the group consisting of $R^5$ and the benzyl radical.

2. The method of claim 1, wherein the compound having the formula:

$$[R_3{}^5R^6N]OH$$

is used in an amount of from 15 to 300 ppm by weight, based on the weight of the reactants, where $R^5$ is an alkyl radical having from 1 to 4 carbon atoms and $R^6$ is selected from the group consisting of $R^5$ and the benzyl radical.

3. The method of claim 1, wherein $R_F$ is a linear perfluoro radical having from 1 to 12 carbon atoms.

4. The method of claim 1, wherein $R_F$ is a branched perfluoro radical having from 1 to 12 carbon atoms.

* * * * *